Sept. 14, 1937.    O. I. SEAVERSON    2,092,859

ELECTRICAL REGULATING APPARATUS FOR RECTIFIERS

Filed Aug. 27, 1935

INVENTOR
Oswald I. Seaverson
BY
HIS ATTORNEY

Patented Sept. 14, 1937

2,092,859

UNITED STATES PATENT OFFICE 2,092,859

ELECTRICAL REGULATING APPARATUS FOR RECTIFIERS

Oswald I. Seaverson, Rawlins, Wyo., assignor to The Union Switch & Signal Company, Swissvale, Pa., a corporation of Pennsylvania Application August 27, 1935, Serial No. 38,139

12 Claims. (Cl. 171—314)

My invention relates to electrical regulating apparatus for rectifiers, and particularly to apparatus of the type involving a direct current load supplied with power from a source of alternating current through a rectifier.

One feature of my invention is the provision, in apparatus of this character, of means for furnishing a constant direct current voltage to the load regardless of variations in the amount of current drawn by the load.

Figure 1:
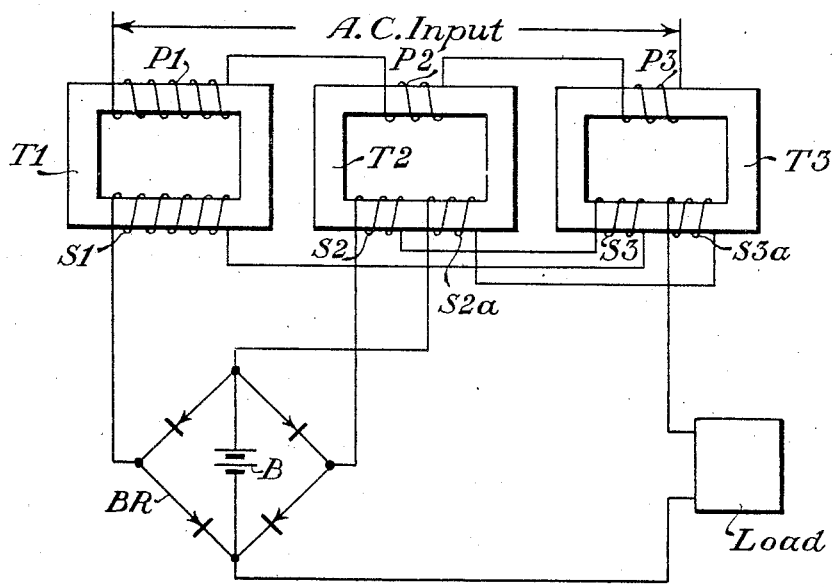
Figure 2:
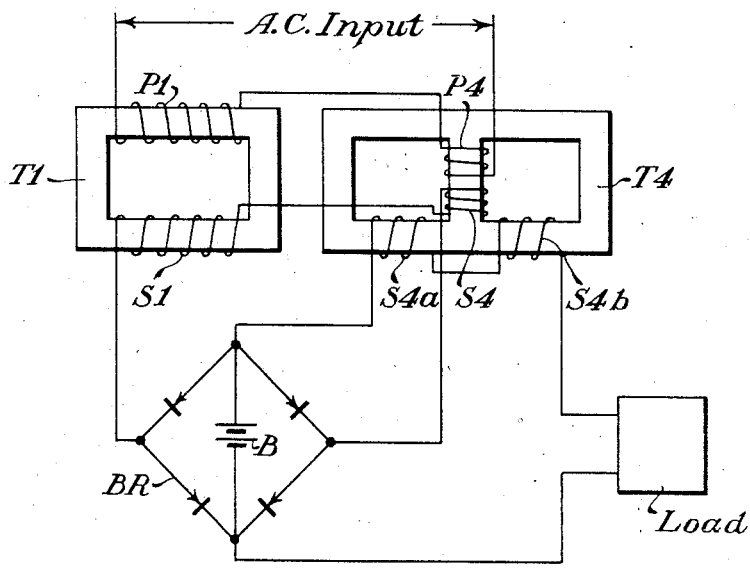

In the accompanying drawing, Figs. 1 and 2 diagrammatically show alternative forms of apparatus each embodying my invention.

Similar reference characters refer to similar parts in each of the views.

Referring first to Figs. 1, the reference characters T1, T2 and T3 designate a main transformer and two auxiliary transformers, having their respective primary windings P1, P2 and P3 connected in series and supplied with alternating current from a suitable source, as indicated. The output or secondary windings S1, S2 and S3 of these transformers are also connected in series and supply alternating current at the desired voltage to the input terminals of a full-wave rectifier BR. The windings S2 and S3 are connected in additive relation and opposed to winding S1, so that the net voltage applied to the rectifier BR comprises the output voltage of the secondary winding S1 of the main transformer T1 less the sum of the output voltages of secondary windings S2 and S3 of transformers T2 and T3. The transformers T2 and T3, in addition to being provided with secondary windings, are provided with saturating windings S2a and S3a. These windings are connected in opposing relation to each other with the free terminal of winding S2a connected to an output terminal of the rectifier BR and the free terminal of winding S3a connected to the direct current load. The other terminal of the load is directly connected to the other output terminal of the rectifier, so that it will be apparent that the entire direct current taken by the load must flow through the saturating windings S2a and S3a. A stand-by storage battery B is also connected across the output terminals of the rectifier BR. Instead of a storage battery, a primary battery may be employed if desired.

As previously stated, the voltage across the input terminals of rectifier BR comprises the output voltage of transformer T1 less the sum of the output voltages of transformers T2 and T3. It follows, therefore, that the normal output voltage of winding S1 of transformer T1 must be greater than the combined voltage of windings S2 and S3. In practice, the output voltages of windings S1, S2 and S3 are such that the net voltage at the output terminals of rectifier BR is sufficient to overcome the electromotive force of the battery B and to maintain the battery in a fully charged condition.

As previously set forth, the entire direct current load passes through the saturating windings S2a and S3a of transformers T2 and T3, and the extent of saturation of the cores of these transformers varies with the variation in the impedance of the load. Therefore, as the load increases, the cores of transformers T2 and T3 become saturated, and consequently the impedance of primary windings P2 and P3 decreases so that more of the alternating current input voltage is shifted to the primary winding P1 of transformer T1. Furthermore, the saturation of the cores of transformers T2 and T3 also reduces their energy transfer efficiency so that the opposing effect of the secondary windings S2 and S3 on winding S1 decreases, with an increase in the load. As a consequence, the output voltage of the rectifier tends to remain constant during relatively wide variations in the load. By careful design of the respective transformers, these transformers and rectifier BR can be made to carry the full load under normal conditions, so that current will be drawn from battery B only when there is an excessive load on the circuit or when a failure of the alternating current supply occurs.

Two transformers T2 and T3 are employed in order to prevent alternating current ripples from being induced into the load circuit by the saturating windings. Since the saturating windings S2a and S3a are equal and are connected in opposing relation to each other, the alternating current ripples will be substantially blocked out.

It will be understood from the foregoing that one of the transformers T2 or T3 may be dispensed with and that voltage regulation can still be obtained. In such a case, however, it will be desirable to include a series reactor in the load circuit to block out the ripple voltage induced in the remaining saturating winding. The use of a reactor, however, may involve certain other difficulties not encountered when two transformers such as T2 and T3 are employed.

In the modified form of the invention illustrated in Fig. 2, I employ one auxiliary three-legged transformer T4 instead of the two transformers T2 and T3. In this view, the primary windings P1 and P4 are connected in series and are supplied with alternating current from a suitable source, as indicated. The secondary windings S1 and S4 are also connected in series, but with opposing polarities and the voltage output of transformer T1 exceeds that of transformer T4 by the amount required to obtain the desired voltage across the output terminals of the rectifier BR. As in Fig. 1, the output or direct current load circuit includes two saturating windings S4a and S4b, respectively, which are arranged on the outside legs of the transformer T4 in additive relation. However, since the primary and secondary windings of transformer T4 are on the middle leg of the transformer, the fluxes set up by these windings will be opposing in the outside legs of the transformer, so that any alternating current voltage induced in the saturating windings S4a and S4b will be substantially neutralized, in well known manner. It will be apparent, therefore, that the apparatus of Fig. 2 may be used to provide the same regulation of the output voltage as provided by the apparatus of Fig. 1.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a direct current load, a transformer having its primary winding connected in circuit with an alternating current source and having its secondary winding connected in circuit with the input terminals of a rectifier through the winding of a choke, a battery connected across the output terminals of said rectifier, a direct current supply circuit for the load also including the output terminals of said rectifier, a second winding of said choke connected with the primary winding of said transformer, and means included in said supply circuit for regulating the impedance of said choke to thereby regulate the amount of current supplied to the primary winding of said transformer in accordance with the amount of current drawn from the supply circuit by the load.

2. In combination, a direct current load, a plurality of transformers having their primary windings included in a circuit connected with a source of alternating current, a battery connected across the output terminals of a rectifier, a second circuit including the secondary windings of said transformers and the input terminals of said rectifier, and a circuit for the load including another winding of one of said transformers and the output terminals of said rectifier.

3. In combination, a direct current load, a plurality of transformers having their primary windings included in a circuit connected with a source of alternating current, a battery connected across the output terminals of a rectifier, a second circuit including the secondary windings of said transformers and the input terminals of said rectifier, at least one of said secondary windings being connected so as to oppose the remaining secondary windings, and a circuit for the load including means for influencing the output of all of said transformers as required to maintain the potential of the direct current supplied to said load substantially constant during variations in the load.

4. In combination, a direct current load, three transformers, a circuit including a primary winding of each of said transformers connected with a source of alternating current, a battery connected across the output terminals of a rectifier, a second circuit including the secondary windings of said transformers and the input terminals of said rectifier, and a circuit for the load including other windings of two of said transformers and the output terminals of said rectifier.

5. In combination, a direct current load, three transformers, a circuit including a primary winding of each of said transformers connected with a source of alternating current, a battery connected across the output terminals of a rectifier, a second circuit including the secondary windings of said transformers and the input terminals of said rectifier, at least one of said secondary windings being connected so as to oppose the remaining secondary windings, and a circuit for the load including means for influencing the output of all of said transformers as required to maintain the potential of the direct current supplied to said load substantially constant during variations in the load.

6. In combination, a direct current load, three transformers, a circuit including a primary winding of each of said transformers connected with a source of alternating current, a battery connected across the output terminals of a rectifier; a second circuit including the secondary windings of two of said transformers connected in additive relation to each other, the secondary winding of the third of the transformers connected in opposing relation to the secondary windings of said two transformers; and the input terminals of said rectifier; and a circuit for the load including other windings of the specified two of said transformers and the output terminals of said rectifier.

7. In combination, a direct current load, three transformers, a primary circuit including the primary windings of said transformers connected with a source of alternating current; a secondary circuit including the secondary windings of said transformers and the input terminals of a rectifier, with the secondary winding of one of said transformers connected in opposing relation to the other two, and a circuit for the load including the output terminals of said rectifier and an auxiliary winding of one of said transformers.

8. In combination, a direct current load, three transformers, a primary circuit including the primary windings of said transformers connected with a source of alternating current; a secondary circuit including the secondary windings of said transformers and the input terminals of a rectifier, with the secondary winding of one of said transformers connected in opposing relation to the other two secondary windings; and a circuit for said load including auxiliary windings of two of said transformers, connected in opposed relation, and the output terminals of said rectifier.

9. In combination, a direct current load, a primary circuit connected with a source of alternating current and including the primary windings of a plurality of transformers, a secondary circuit including the input terminals of a rectifier and the secondary windings of said transformers, and a circuit for the load including a saturation winding on one of said transformers and the output terminals of said rectifier.

10. In combination, a direct current load, a primary circuit connected with a source of alternating current and including the primary windings of two transformers, a secondary circuit including the input terminals of a rectifier and the secondary windings of said transformers; and a circuit for the load including additional windings of one of said transformers connected in series with the output terminals of said rectifier.

11. In combination, a direct current load, a first circuit connected with a source of alternating current and including the primary windings of two transformers, a second circuit including the input terminals of a rectifier and the secondary windings of said transformers, and a circuit for the load including other windings of one of said transformers for regulating the output of said transformers in accordance with the magnitude of the load and arranged in such a manner that alternating current induced in one of such other windings is substantially neutralized by an oppositely disposed alternating current induced in the other of such other windings.

12. In combination, a direct current load, a first circuit connected with a source of alternating current and including the primary windings of a plurality of transformers, a second circuit including the input terminals of a rectifier and the secondary windings of said transformers, and a circuit for the load including other windings of certain of said transformers for regulating the output of all of said transformers in accordance with the magnitude of the load and arranged in such a manner that alternating current induced in one of such other windings is substantially blocked out by a like current induced in the opposing direction in the other of said other windings.

OSWALD I. SEAVERSON.